Patented Nov. 25, 1941

2,263,912

UNITED STATES PATENT OFFICE 2,263,912

PURIFICATION OF NITROGEN BASES

James R. Bailey and Raymond Mahan, Austin, Tex., assignors to Union Oil Company of California, Los Angeles, Calif., a corporation of California No Drawing. Application August 30, 1937, Serial No. 161,626

11 Claims. (Cl. 260—269)

This invention relates to a process for the purification of nitrogen bases. More specifically, the invention relates to the production of pure nitrogen bases from raw stock, such as petroleum, shale oil, coal tar and products obtained by the pyrolysis of certain organic substances, such as cottonseed meal.

Nitrogen bases which are recovered from the aforementioned raw materials by conventional treatment with sulphuric acid or with polar solvents, such as sulphur dioxide, contain impurities in the form of mineral oil, thio compounds, i. e. sulphur containing compounds, phenols, carbonaceous materials and dark asphalt-like bodies which impair the purity of the nitrogen bases. Water is also frequently present as an impurity, particularly in the case of the more water soluble bases of lower molecular weight.

We have discovered a process whereby nitrogen bases may be effectively separated from the foregoing impurities. In the operation of our process the nitrogen bases are converted into salts which permit the separation of the impurities with which they are contaminated by such means as solvent extraction or fractional distillation or a combination of both of these methods.

Briefly stated, the process consists in treating nitrogen bases with a salt adapted to form a double salt or a similar complex with the nitrogen base which double salt is stable up to a relatively high temperature above which temperature it dissociates to yield the nitrogen base. Salts forming the desired type of complex with the nitrogen bases are mercuric chloride, cadmium chloride and lead chloride and the like and in particular zinc chloride. The other halides of these metals may also be used. These inorganic salts combine with the nitrogen base to form a complex containing two molecules of nitrogen base per one molecule of inorganic salt. Similar complexes may also be formed using nitrogen base hydrochlorides in the place of the nitrogen base itself and under these circumstances a complex is formed which contains two molecules of nitrogen base hydrochloride per one molecule of the inorganic salt. Other types of complexes may also be formed and we do not wish to be bound by any theory as to the exact nature of their composition since our process depends only upon the above described physical property of such complexes, namely their stability towards heat below a relatively high temperature of dissociation and their dissociation at temperatures above this critical temperature to yield vapors of the nitrogen bases and a solid residue of the inorganic salt.

In essence, the process consists in treating nitrogen bases with a suitable salt of the type described, such as zinc chloride, to convert the nitrogen bases into a complex, for instance, the zinc chloride-base complex $(base)_2 ZnCl_2$. This treatment when carried out on impure bases gives a mixture of the complex with unchanged impurities, such as oils, phenols, color bodies thio compounds, water, and the like. This mixture is then subjected to distillation adapted to remove the water, oil phenols, sulphur compounds and other impurities as vapors. This distillation is conducted at temperatures below the dissociation temperature of the complex salt of the nitrogen base, for example, in the case of a complex formed from pyridine and zinc chloride, the distillation is carried out at a temperature below 320° C. and preferably below a temperature of 250° C., using a vacuum or other aid to distillation if these temperatures are not sufficiently high to completely remove the admixed impurities at atmospheric pressure.

After the removal of the volatile impurities present by distillation, the complex salt of the nitrogen base which remains as a residue in the still is then heated to above its dissociation temperature which in the case of the pyridine zinc chloride complex is in excess of about 320° C. and preferably about 350° C. At these temperatures the complex dissociates into the free base and the inorganic salt and the base may be distilled over and cooled as a distillate while the inorganic salt remains in the distillation flask as a residue and may be used in further treatments.

According to this process, the decomposition of a neutral complex of the type $(base)_2 ZnCl_2$ yields as the final distillate a pure anhydrous base in the free form. If, however, a complex containing hydrochloric acid is used, for instance, a complex of the type $(base HCl)_2 ZnCl_2$, the final step of dissociation yields vapors of both base and of hydrogen chloride which then condense in the cooler portions of the equipment as base hydrochloride. In case a free base is desired, it may, of course, be obtained from the hydrochloride as produced in this latter instance but normally only by methods which involve the use of aqueous solutions and which are not, therefore, adapted to yield an anhydrous free base. Consequently, if it is desired to produce an anhydrous free base from a mixture containing acidic complexes, it is desirable to convert such acidic complexes as may be present into neutral complexes prior to distillation or dissociation, which conversion may be readily effected by addition of suitable amounts of alkali. Conversely, when a pure base hydrochloride is desired as the product, sufficient HCl should be present either in the initial reagents or as a result of subsequent addition of HCl to convert all the bases to hydrochlorides.

A modification of the process consists in treating the complex formed from the impure base with a washing fluid effective as a solvent for some or all of the impurities present in the base and which has substantially no solvent action upon the complex, removing the solvent solution of impurities from the complex and then distilling the so purified complex first to remove any solvent or other impurities present and then continuing the distillation to a higher temperature to cause dissociation of the complex into the inorganic salt and the free base, as set forth above.

The solvents which we employ for this purpose have substantially no solvent power upon the complex but are good solvents for impurities such as phenols, oils and asphaltic materials. Among the solvents which we may employ are gasoline, naphtha, liquid butane, carbon tetrachloride and a number of higher ketones. These solvents are capable of dissolving the impurities present in the zinc bases but have very little solvent power for the zinc base itself. Furthermore, these solvents have boiling ranges different from the boiling ranges of the bases themselves and this permits ready separation of the solvent from the free bases or their complexes by distillation. In fact, most of the solvents in the aforementioned group have lower boiling ranges than the free bases themselves and are readily removable from the base by distillation at relatively low temperatures. This feature is particularly advantageous when sufficient purification is obtained by washing the complex to permit the omission of the distillation and dissociation steps, under which circumstances the bases may be recovered from the washed complex by suitable treatment, e. g. displacement with caustic alkali, and then freed from any remaining solvent by distillation or partial evaporation.

In carrying out our process, the crude nitrogen bases are preferably contacted with granular or powdered zinc chloride to form the zinc chloride base complex, $(base)_2 ZnCl_2$. This reaction may be expedited by providing agitation and if necessary by raising the temperature, although in general heat is evolved by this reaction. In case complexes are formed which contain more or less hydrogen chloride, as when the base hydrochlorides are used in the place of free bases or when moisture is present which admits hydrolysis of the zinc chloride to yield hydrogen chloride or when an aqueous solution of zinc chloride is used in the place of anhydrous zinc chloride, the acid complexes may be converted into neutral complexes by the addition of alkali.

An indication which may be employed to determine when sufficient caustic soda has been added to exactly neutralize the hydrochloric acid is the appearance of a slight precipitation of zinc hydroxide. At this point all of the hydrochloride present in the hydrochloride base is fully neutralized. The zinc hydroxide is formed as a result of the presence of free zinc chloride since during the formation of the base an excess of zinc chloride is usually employed. Another indication of the formation of the neutral salt is the liberation of a small amount of the free base just as a slight excess of caustic soda is added. In other words, after all of the hydrochloric acid present in the zinc chloride-hydrochloride base is neutralized a small quantity of the base is liberated and this liberation can be detected by the odor of the resulting material.

The neutral zinc chloride base produced as described above and still admixed with impurities is then subjected to distillation. At the beginning of distillation all of the water present in the mixture is distilled off. After the removal of the water such materials as free phenols, thio compounds, and mineral oils are distilled away from the zinc base. After the removal of the water, oil, thio compounds, and phenols the temperature of the mass is raised to a point sufficiently high to cause dissociation of the zinc chloride base into free base and free zinc chloride. The base vapors are separately condensed and the zinc chloride which remains in the distillation flask as a residue is ready for re-use. When considerable quantities of non-volatile impurities such as carbonaceous materials are present in the crude bases, the zinc chloride distillation residue may be freed from the impurities before re-use by leaching with water, separating the zinc chloride solution thus formed from the insoluble material, and evaporating the solution to obtain the zinc chloride.

The following is an example of our process: 50 ml. of "Eastman pyridine," ($n$ 25/D 1.4988) B. P. 113.5–115.5° C.) were placed in a 125 ml. Claisen distillation flask provided with a reflux condenser. There was also added to the flask sufficient powdered zinc chloride to react with the pyridine and to form the complex $(pyridine)_2 ZnCl_2$ and leave a slight excess of zinc chloride. This mass was thoroughly agitated with a resultant evolution of an appreciable quantity of heat. The temperature of the mass is ordinarily raised sufficiently by the evolution of the heat of reaction to cause a portion of the nitrogen bases to be volatilized. The volatilized bases are cooled by means of the reflux condenser and returned to the reaction zone. After agitation of the mass for a period of about one hour aqueous sodium hydroxide was gradually added to the mass until zinc hydroxide began to precipitate. At the end of the reaction the double zinc salt of pyridine crystallized out upon cooling. The reflux condenser was then removed and in its place there was substituted a regular Liebig condenser for the condensation of the vapors outside of the zone of vaporization. Heat was applied to the Claisen distillation flask and the mixture in the flask was submitted to distillation. Four ml. of water and hydrocarbon oil of an aromatic odor were distilled off at atmospheric pressure and collected in the receptacle used as a receiver at the end of the Liebig condenser. The Liebig condenser was then connected to a vacuum pump and the pressure within the Claisen flask was reduced to an absolute pressure of 25 millimetres of mercury. The temperature of the contents within the flask was maintained at 150° C. by means of a bath surrounding the Claisen flask. This final distillation at reduced pressure removed all of the hydrocarbon oil and other impurities present, which were obtained as a condensate and discarded. After the foregoing distillation the residual salt cake remaining in the Claisen flask was heated on a hot plate to the dissociation temperature of the zinc complex which was around 320° to 350° C. The vapors hereby evolved were condensed and the distillate which was produced was found to be pure pyridine with a refractive index of n 25/D 1.5046. The rise in refractive index is indicative of the degree of purification obtained. This distillate gave a negative test for chloride and showed no change in refractive index after remaining in contact with solid sodium hydroxide for twenty-four hours.

As a second example of the method of carrying out our process to purify crude nitrogen bases the following experiment was performed: 10 cc. of crude nitrogen bases recovered from California asphalt base kerosene distillate, having a boiling point range of between 210° and 215° C. and containing 0.21% of sulphur were agitated with excess of ground zinc chloride in the Claisen flask provided with a reflux condenser for a period of about one hour at a temperature of approximately 80° C. At the end of this period sufficient aqueous caustic soda was added to the mass in the Claisen flask to cause a slight precipitation of zinc hydroxide. At this point the reflux condenser was removed and a regular condenser placed in its stead. Heat was applied to the mixture in the flask and the water, hydrocarbon oil and thio compounds were removed as distillates. After removal of the foregoing impurities the zinc base was then heated to a temperature sufficiently high to dissociate the base into free zinc chloride and a free base and the latter was recovered as a distillate in an anhydrous form completely free of sulphur and hydrocarbon oil.

As explained above, the process is applicable to nitrogen bases contained in hydrocarbon oil, shale oil, coal tar distillates and nitrogen bases produced by the pyrolysis of such materials as cottonseed meal. Many modifications of the process may be employed for the purification of nitrogen bases recovered from the foregoing sources. For example, petroleum fractions containing nitrogen bases may be treated with sulphuric acid for the separation of the nitrogen bases from the acids in the form of a sludge. The sludge so produced may then be treated with caustic alkali for the liberation of the bases. These bases may then be treated with zinc chloride to form the zinc chloride base complex and then, if necessary, treated with sufficient caustic soda to neutralize any hydrochloric acid present. The mixture thus formed may then be distilled, as set forth above, for the removal of such impurities as phenols, oil and sulphur. The cake remaining in the flask containing the normal zinc chloride base may then be heated to the dissociation temperature for the liberation of the bases from the zinc chloride.

Another modification of the process may be carried out as follows: Petroleum fractions containing nitrogen bases may be extracted with a polar solvent, such as sulphur dioxide or phenol. The extract obtained by the extraction of the hydrocarbon oil with a polar solvent contains the more aromatic fractions of the hydrocarbon oil together with the nitrogen base compounds which are aromatic-like in their solubility relationships. After removal of the polar solvent in the extract first produced by extracting hydrocarbon oil containing nitrogen bases with a material such as sulphur dioxide, the extract is then contacted at an elevated temperature with granular zinc chloride. The salts thus produced by the interaction between the zinc chloride and the nitrogen bases present in the extract are zinc chloride base complexes, with or without some hydrochloride, plus excess zinc chloride. These materials are insoluble in the oil phase and are readily separated by allowing the mass to settle and decanting away the supernatant oil or by filtration of the mixture and recovery of the salts as a filter cake. These complex salts contain an appreciable quantity of mineral oil which in many instances have boiling point ranges similar to that of the bases themselves. If it is desired to remove this oil from the salts the latter material is agitated thoroughly at ordinary temperature with a solvent, such as naphtha, gasoline or liquid butane. This mixture is then decanted or filtered for the separation of the gasoline solution of oil from the insoluble salts. This extraction of the oil from the zinc chloride base may be repeated several times with the low boiling solvent in order to substantially remove all of the oil present from the zinc salts. The salts are then causticized with aqueous sodium hydroxide sufficient to convert and to remove any hydrochloric acid from the base molecules. The causticized material may be purified by distillation and then dissociated, as set forth above. Alternately, the solvent purified complex salts may be treated with sufficient caustic soda to liberate the bases. Upon addition of an excess of caustic soda to the purified zinc base salt the bases are liberated and rise to the top forming an upper layer of nitrogen bases. The lower aqueous layer comprises caustic soda, zinc hydroxide, and sodium chloride. These two layers may then be separated by ordinary decantation means and the upper layer consisting chiefly of pure nitrogen bases may then be further purified by simple distillation.

A third modification consists in extracting hydrocarbon oil containing nitrogen bases with a polar solvent, such as sulphur dioxide. The extract phase so produced is then distilled for the removal of the sulphur dioxide and then treated with sulphuric acid for the separation of the bases present as a sludge. The sludge so produced is separated by decantation from the remaining mineral oil or extract and treated with caustic soda for the liberation of the bases. The bases so liberated are then recovered and treated with granular zinc chloride to convert them into the complex salts and then subsequently distilled for the removal of the water, phenol, thio compounds and hydrocarbon oil present. After removal of the impurities the distillation is continued to a temperature sufficiently high to dissociate the zinc base residue into zinc chloride and free bases the latter being distilled over and recovered as a distillate.

The complex salts may be formed by treating the nitrogen bases with powdered zinc chloride, as described above, or aqueous solutions of zinc chloride may be reacted with the base to yield the complex. In place of the free nitrogen bases aqueous solutions of water soluble salts, such as base hydrochloride or hydrosulphite may be used. The complexes, such as base hydrochloride zinc chloride formed in this latter instance are insoluble in water and may be separated from the water before distillation.

The formation of the neutral complex may be written as follows: 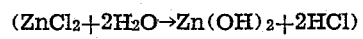

To the degree that HCl is present, either added or formed by the hydrolysis of zinc chloride $$(ZnCl_2 + 2H_2O \rightarrow Zn(OH)_2 + 2HCl)$$

the formation of the acidic complex occurs:

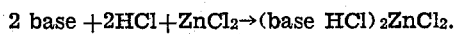

The neutralization of the acidic complex is as follows:

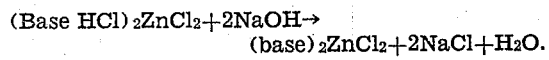
$$(\text{Base HCl})_2 \text{ZnCl}_2 + 2\text{NaOH} \rightarrow (\text{base})_2 \text{ZnCl}_2 + 2\text{NaCl} + \text{H}_2\text{O}.$$

The neutral complex dissociates at temperatures above its dissociation temperature as follows: $(\text{base})_2\text{ZnCl}_2 \rightarrow 2 \text{ base} + \text{ZnCl}_2$, while the acidic complex dissociates as follows:

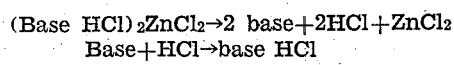
$$(\text{Base HCl})_2\text{ZnCl}_2 \rightarrow 2 \text{ base} + 2\text{HCl} + \text{ZnCl}_2$$
$$\text{Base} + \text{HCl} \rightarrow \text{base HCl}$$

The process may be applied to crude or partly purified bases, and may also be applied to very dilute concentrations of bases in oils and the like, whereby it serves to extract the nitrogen bases as well as to purify them. Thus granular zinc chloride or aqueous solutions of zinc chloride may be used to contact petroleum distillates and the like, whereby the nitrogen bases are extracted from the distillate and converted into complexes which, with or without an intervening solvent wash, may be distilled to remove volatile impurities and then dissociated to yield the pure bases.

The foregoing examples are illustrative of the present invention, but the broad scope of the invention is not to be exactly limited to the descriptive material or numerical data given therewith.

We claim:

1. A process for purifying organic nitrogen bases containing naturally occurring impurities having substantially the same boiling point range as the bases themselves, comprising the steps of treating the nitrogen bases with a reagent chosen from the class consisting of zinc chloride, mercuric chloride, cadmium chloride and lead chloride to form complexes thermally dissociable only at high temperatures, and heating the mixture containing the impurities and said complexes at temperatures below the dissociation temperature of the complexes thereby removing the impurities by their vaporization.

2. A process as in claim 1, including the subsequent steps of heating the complexes to at least their dissociation temperature to produce vapors of purified nitrogen bases, and recovering and condensing said vapors.

3. The process of purifying nitrogen bases contained in petroleum, shale oil, coal tar, and the products obtained by the pyrolysis of cottonseed meal which contain naturally occurring impurities having substantially the same boiling point range as the bases themselves which comprises reacting the bases with a chloride of a metal selected from the class consisting of zinc, cadmium, mercury and lead in slight excess to form a metallic chloride-nitrogen base complex, adding sufficient alkali to neutralize any base hydrochloride, distilling at temperatures below the dissociation temperature of the complex to vaporize and remove all volatile impurities, heating the residue from said distillation to at least the dissociation temperature of the complex to cause dissociation of said complex, and recovering the nitrogen base vapors produced by said dissociation.

4. In a process according to claim 3 wherein the distillation at temperatures below the dissociation temperature of the complex vaporizes the water, hydrocarbon, thio-compounds, and the like as impurities.

5. A process for the preparation of pure organic compounds containing basic nitrogen comprising treating basic organic nitrogen compounds containing naturally occurring impurities having substantially the same boiling point range as the bases themselves with sufficient zinc chloride to convert substantially all of the nitrogen bases into zinc chloride-nitrogen base complexes, adding sufficient alkali to neutralize any base hydrochloride, heating the mixture of the complex and impurities to a temperature less than the decomposition temperature of the complex but sufficient to vaporize the volatile impurities, withdrawing the vaporized impurities, heating the complex thus freed from volatile impurities to at least the decomposition temperature of the complex, thereby obtaining nitrogen base vapors and a residue comprising zinc chloride and non-volatile impurities, and separating said vapors from said residue.

6. A process according to claim 5, in which the complex is partially purified before distillation by commingling the complex as formed from the impure nitrogen bases with a solvent inert towards the complex but adapted to dissolve at least a portion of the impurities, and separating the complex from the solvent containing the dissolved impurities.

7. A process for the recovery of nitrogen bases from crude source material containing naturally occurring impurities having substantially the same boiling point range as the bases themselves comprising treating the crude source material with zinc chloride to form a nitrogen base-zinc chloride complex, distilling the mixture comprising the residual source material and the complex thus formed at temperatures below the dissociation temperature of the complex to separate said complex from the residual source material, and decomposing the separated complex to obtain free nitrogen bases.

8. A process according to claim 7 in which the crude source material is a petroleum distillate.

9. A process according to claim 7 in which a petroleum distillate is first treated with a polar solvent to yield an extract and said extract is employed as said crude source material.

10. A process for the purification of nitrogen bases containing naturally occurring impurities having the same boiling point range as the bases themselves comprising treating the impure bases with zinc chloride to form a nitrogen base-zinc chloride complex, heating the mixture of impurities and complexes to temperature below the dissociation temperature of the complex thereby vaporizing impurities from said complex, and decomposing the complex to obtain purified nitrogen bases.

11. In a process according to claim 8 wherein the decomposition of the complex is realized by heating the same to temperatures above the dissociation temperature of the complex.

JAMES R. BAILEY.
RAYMOND MAHAN.

CERTIFICATE OF CORRECTION.

Patent No. 2,263,912.  November 25, 1941.

JAMES R. BAILEY, ET AL.

It is hereby certified that error appears in the printed specification of the above numbered patent requiring correction as follows: Page 3, second column, line 10-11, for "emperature" read --temperature--; page 4, second column, line 58, claim 10, for "temperature" read --temperatures--; line 63, claim 11, for the claim reference numeral "8" read --10--; and that the said Letters Patent should be read with this correction therein that the same may conform to the record of the case in the Patent Office.

Signed and sealed this 26th day of May, A. D. 1942.

(Seal)

Henry Van Arsdale,
Acting Commissioner of Patents.